US012794365B2

(12) United States Patent
Daly et al.

(10) Patent No.: US 12,794,365 B2
(45) Date of Patent: Nov. 10, 2026

(54) CIRCUIT FOR CALCULATING EFFICIENCY IN SWITCHING REGULATORS

(71) Applicant: Analog Devices, Inc., Wilmington, MA (US)

(72) Inventors: Michael Daly, San Jose, CA (US); Gabriele Bernardinis, San Jose, CA (US); Lok Hin Cheng, Santa Clara, CA (US)

(73) Assignee: Analog Devices, Inc., Wilmington, MA (US)

( * ) Notice: Subject to any disclaimer, the term of this patent is extended or adjusted under 35 U.S.C. 154(b) by 191 days.

(21) Appl. No.: 18/720,540

(22) PCT Filed: Dec. 15, 2022

(86) PCT No.: PCT/US2022/081690

§ 371 (c)(1),
(2) Date: Jun. 14, 2024

(87) PCT Pub. No.: WO2023/114927

PCT Pub. Date: Jun. 22, 2023

(65) Prior Publication Data

US 2025/0088102 A1 Mar. 13, 2025

Related U.S. Application Data

(60) Provisional application No. 63/290,590, filed on Dec. 16, 2021.

(51) Int. Cl.
*H02M 3/157* (2006.01)
*H02M 1/00* (2007.01)

(52) U.S. Cl.
CPC ......... *H02M 3/157* (2013.01); *H02M 1/0012* (2021.05)

(58) Field of Classification Search
None
See application file for complete search history.

(56) References Cited

U.S. PATENT DOCUMENTS 6,992,470 B1 1/2006 Chiu
7,619,908 B2 11/2009 Hofmeister et al.
(Continued)

FOREIGN PATENT DOCUMENTS

WO WO-2023114927 A1 6/2023

OTHER PUBLICATIONS

Olivier Trescases et. al, Digitally Controlled Current-Mode DC-DC Converter IC, Oct. 2010, IEEE Transactions on Circuits and Systems I: Regular Papers ( vol. 58, Issue: 1, Jan. 2011) (Year: 2010).*
(Continued)

*Primary Examiner* — Crystal L Hammond
*Assistant Examiner* — Seung Ho Choi
(74) *Attorney, Agent, or Firm* — Schwegman Lundberg & Woessner, P.A.

(57) ABSTRACT

The present subject matter improves efficiency of a switching power supply. Generally, in a switching power supply scheme as described herein, the input voltage and an output voltage of the switching power supply are monitored. A bitstream is produced using the input voltage, the output voltage, and a switching control signal used to control charging of an inductor of the switching power supply. The bitstream is representative of efficiency of operation of the switching power supply. One or more operating parameters of the switching power supply according to the bitstream.

16 Claims, 6 Drawing Sheets

(56) References Cited

U.S. PATENT DOCUMENTS

| | | | | |
|---|---|---|---|---|
| 2006/0125458 | A1 | 6/2006 | Chapuis | |
| 2008/0285184 | A1 | 11/2008 | Phadke et al. | |
| 2022/0334155 | A1* | 10/2022 | Krug et al. ........... | H03M 3/458 |

OTHER PUBLICATIONS

Zhichao Tan et. al, Incremental Delta-Sigma ADCs: A Tutorial Review. Dec. 2020, IEEE Transactions on Circuits and Systems I: Regular Papers ( vol. 67, Issue: 12, Dec. 2020) (Year: 2020).*

"International Application Serial No. PCT/US2022/081690, International Search Report mailed Mar. 31, 2023", 3 pgs.

"International Application Serial No. PCT/US2022/081690, Written Opinion mailed Mar. 31, 2023", 6 pgs.

"International Application Serial No. PCT/US2022/081690, International Preliminary Report on Patentability mailed Jun. 27, 2024", 8 pgs.

* cited by examiner

CIRCUIT FOR CALCULATING EFFICIENCY IN SWITCHING REGULATORS

This application is a U.S. National Stage of PCT Application Serial No. PCT/US2022/081690, filed Dec. 15, 2022, which claims priority to U.S. Provisional Application Ser. No. 63/290,590, filed Dec. 16, 2021, which are hereby incorporated by reference herein in their entirety.

BACKGROUND

Electronic systems can include one or more switching power supplies. Some switching power supplies receive a direct current (DC) input voltage and convert the DC input voltage to a DC output of a different voltage (i.e., a DC-to-DC switching converter). It can be desirable to ensure that switching power supplies are operating efficiently, such as when an electronic system has a limited energy supply for example.

FIELD OF THE DISCLOSURE

This document pertains generally, but not by way of limitation, to switching power supplies, and more particularly, to techniques for monitoring the efficiency of a switching power supply in a given system operating condition and to techniques for improving the efficiency of operating a switching power supply.

BRIEF DESCRIPTION OF THE DRAWINGS

The drawings illustrate generally, by way of example, but not by way of limitation, various embodiments discussed herein. The drawings are not necessarily drawn to scale.

DESCRIPTION

Figure 1:
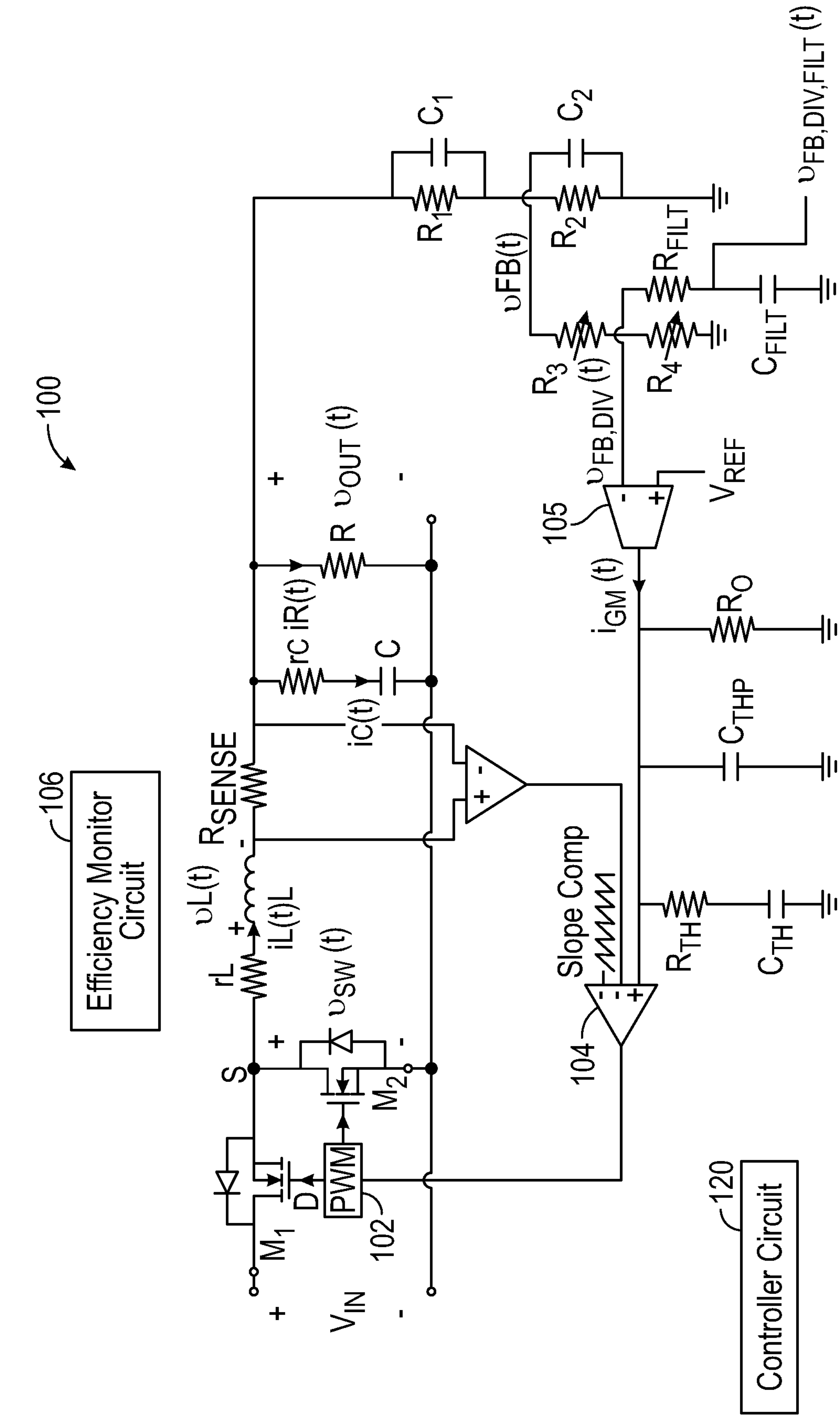
FIG. 1 is a circuit diagram of an example of a switching power supply circuit for an electronic system.

FIG. 1 is a circuit diagram of an example of a switching power supply circuit for an electronic system. The switching power supply circuit includes a switching DC-to-DC converter circuit. The switching converter circuit 100 is a buck converter, or step down converter, that produces an output voltage vout(t) at load R that is less than the input voltage $V_{IN}$. The switching converter circuit 100 includes an inductor L that is charged and discharged to produce the output voltage. The switching converter circuit 100 includes a switch circuit that includes two power transistors $M_1$ and $M_2$ that are used to charge and discharge the inductor L. The switch circuit also includes a switch control circuit 102 to control activation of the power transistors $M_1$, $M_2$. The switch control circuit 102 applies switching control signals to the power transistors $M_1$, $M_2$ to control the charging and discharging of the inductor L. The switch control circuit 102 may use pulse width modulation (PWM) to control the power transistors $M_1$, $M_2$. The switching control signal applied to power transistor $M_1$ has duty cycle D. The power transistors $M_1$, $M_2$ are activated alternately to charge and discharge the inductor L. The switch control circuit 102 may impose dead time between the alternate activation between $M_1$ and $M_2$ to avoid large shoot-through currents that can occur when both power transistors are on at the same time.

The output voltage vout(t) of the switching converter circuit 100 is regulated to a voltage target using a control loop that includes a feedback circuit path. The output voltage is divided down using resistors $R_1$ and $R_2$ and used to produce a feedback voltage $v_{FB}(t)$. The control topology of the circuit is a peak current mode control scheme. The feedback voltage is divided down $v_{FB,\ DIV}(t)$ and is fed into a transconductance amplifier 105. The output of the transconductance amplifier 105 is the current $i_{GM}(t)$, which is fed into a compensation network comprised of $R_{TH}$, $C_{TH}$, and $C_{THP}$. The current that flows into the compensation network generates a voltage that is fed as an input, along with slope compensation and current sense information, into an error amplifier 104.

In some converters, the user can change the resistor divider ratio that divides $v_{OUT}(t)$ down to $v_{FB}(t)$ with resistors R1 and R2. Resistors R1 and R2 can be discrete components external to the converter circuit. Typically, in such converters, R3 and R4 are not present such that $v_{OUT}(t)$ is scaled down to $v_{FB}(t)$, and $v_{FB}(t)$ is directly tied to the input of the transconductance amplifier in a peak current control scheme.

In other converters, the user communicates to the converter the desired output voltage, and the converter internally changes the resistor divider ratio via variable resistors R3 and R4, which are internal to the converter circuit. Typically, in such converters, R2 and R1 are not present such that $v_{OUT}(t)=v_{FB}(t)$, and $v_{OUT}(t)=v_{FB}(t)$ is scaled down to generate $v_{FB,\ DIV}(t)$.

It may be desired to monitor the operation of the switching converter circuit 100 to ensure it is operating efficiently. The real time efficiency η of the switching converter circuit can be determined from calculations including the output voltage $V_{OUT}$, output current $I_{OUT}$, input voltage $V_{IN}$, and input current $I_{IN}$. The electronic system can include a monitoring circuit for each of $V_{OUT}$, $I_{OUT}$, $V_{IN}$, and $I_{IN}$. The outputs from the monitoring circuits can be quantized using one or more analog-to-digital converter (ADC) circuits and the quantized values can be provided (e.g., via power management bus or PMBus) to a processor of the electronic system to compute the efficiency.

These calculations need to be computed and acted upon in real time and can be burdensome to the system. Also, the real time calculations that can be achieved in a practical manner are inaccurate because they assume ideal converter behavior (zero dead time, ideal switching behavior) and ideal conditions (ambient temperature). Accounting for nonideal converter behavior and nonideal conditions would make the calculations too complex and impractical to implement real time without significant performance tradeoffs, specifically the area and power necessary to implement the calculations. Moreover, these real time calculations cannot account for other conditions that affect efficiency in a closed loop manner. For example, temperature of the converter affects the on resistance of its power MOSFETs, which affects the duty cycle, which ultimately affects efficiency. The converter's efficiency (or equivalently power loss) in turn affects the temperature of the converter, through the thermal impedance of the converter's package. Practical calculations will likely assume that the on resistance is independent of temperature.

Figure 2:
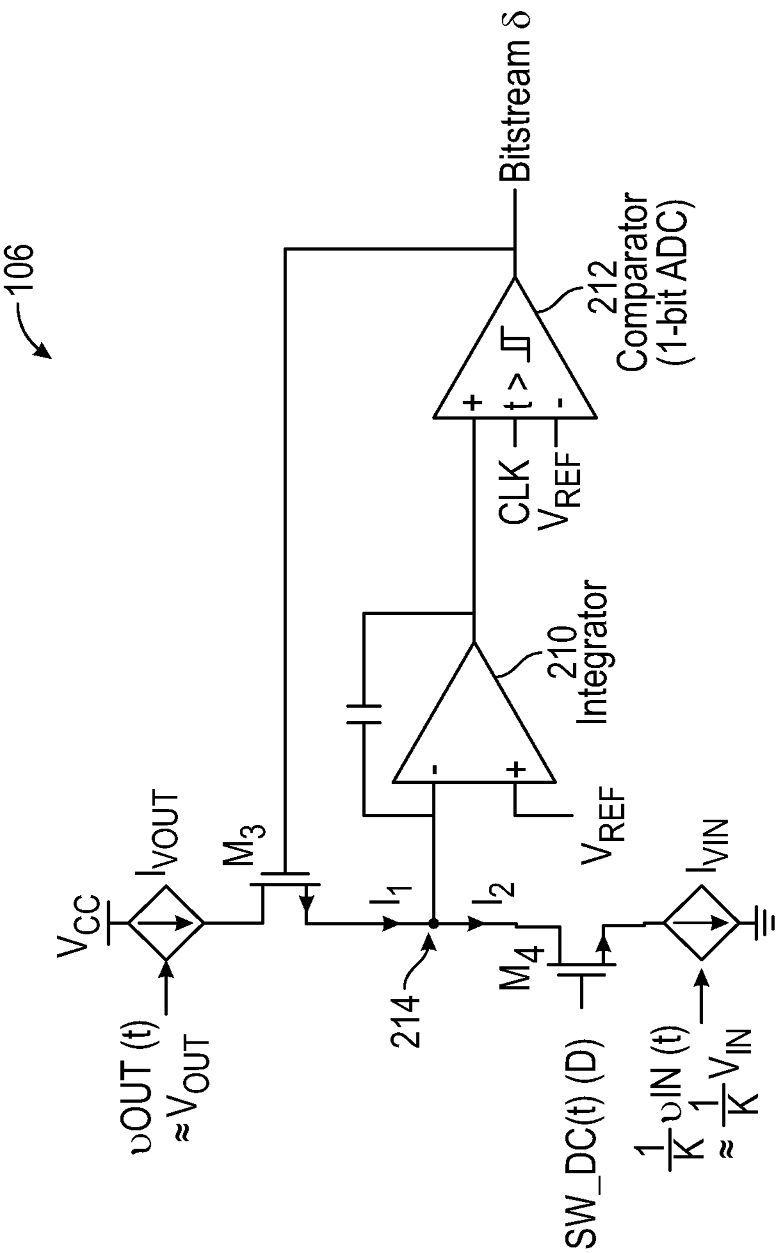
FIG. 2 is a circuit diagram of an example of an efficiency monitor circuit for a switching power supply circuit.

FIG. 2 is a circuit diagram of an example of an efficiency monitor circuit 106 to monitor the efficiency of a switching converter circuit, such as the switching converter circuit 100 in the example of FIG. 1. The efficiency monitor circuit 106 measures the efficiency η of a switching converter circuit without the need of the typical and burdensome computations necessary in real time that include $V_{OUT}$, $I_{OUT}$, $V_{IN}$, and $I_{IN}$. The efficiency monitor circuit 106 is designed to incorporated with the converter rather than a separate circuit. The circuit behaviors within the converter circuit that are often not considered in real time calculations due to their complexity and interconnected nature, are considered by the onboard efficiency monitor circuit 106.

The circuit includes a first order sigma-delta (ΣΔ) ADC that includes an integrator stage 210 and a single-bit quantizer (comparator 212) or one-bit ADC stage. The input node 214 to the sigma-delta ADC is connected between two field effect transistors (FETs) $M_3$ and $M_4$. The output of the sigma-delta ADC is a bitstream, or a serial sequence of one bits and zero bits. The output of the sigma-delta ADC, or the bitstream is fed back to the top FET $M_3$. The top FET $M_3$ conducts current from a current source $I_{VOUT}$ that is representative of the output voltage $V_{OUT}$ when the value of the bitstream is 1. The bottom FET $M_4$ is controlled by SW_DC (t), which is a signal representative of the voltage $v_{SW}(t)$ of the switch node S translated to the voltage level of the digital supply domain voltage. The signal SW_DC(f) encodes the duty cycle D in its pulse width over a switching period. The "one's density" of the bitstream can be denoted as δ and can be the ratio of the number of one bits in the bitstream to the number of total bits in the bitstream. The bottom FET $M_4$ conducts current from a current sink $I_{VIN}$ that is representative of a scaled version of the input voltage ($V_{IN}$/k) to ensure that the density of ones in the output bitstream δ is between 0 and 1 and does not exceed 1.

In steady state operation, the net current into the inverting terminal of the amplifier of the integrator stage 210 must be zero and the net current into the capacitor of the integrator stage 210 is also zero due to charge balance. Therefore, the currents into the amplifier and capacitor must balance such that their averages must be equal, $I_1=I_2$. Assuming ideal switches for $M_3$ and $M_4$, $I_1=V_{OUT}\delta$ and $I_2=(V_{IN}/k)\cdot D$ such that the output bitstream δ in terms of the converter's operating conditions can be calculated as $$\delta V_{OUT} = D\frac{V_{IN}}{k},$$

$$\delta = D\frac{V_{IN}}{kV_{OUT}}.$$

The bitstream one's density δ can be obtained with digital logic circuitry that accumulates the number of one bits that occur in the bitstream over a number of clock cycles. Alternatively, the digital logic circuitry may accumulate the number of zero bits that occur in the bitstream and subtract from the total number to determine the number of one bits. For the first order sigma-delta ADC architecture, n bits of resolution are obtained by accumulating the count of one bits over a specified time period of $2^n$ clock cycles. Although longer accumulation or acquisition times increase resolution, the bandwidth of the circuitry diminishes such the output bitstream δ reacts slowly to changes in the operating conditions of the switching converter circuit 100. Furthermore, diminishing returns are associated with longer acquisition times because the first order sigma-delta ADC shapes the quantization noise and ultimately determines the noise floor, the noise cannot be further reduced by longer accumulation or acquisition times. The noise floor is determined by thermal noise (kT/C) and other circuit nonlinearities such as integrator open loop gain and comparator delay variation.

The error between the duty cycle D calculated with the output bitstream density δ and the measured duty cycle for the switching converter circuit 100 falls within the plus or minus one least significant bit (±1 LSB) noise floor of ($\pm 1/2^{14}$). The operating conditions of the switching converter circuit 100 are $V_{IN}$=16 Volts (16V), $V_{OUT}$=3.3V, switching frequency of 1 Megahertz ($F_{SW}$=1 MHz), and an inductor L of 437 nano-Henrys (437 nH).

The efficiency of the switching converter circuit 100 can be expressed as $$\eta = \frac{P_{OUT}}{P_{IN}} = \frac{V_{OUT}I_{OUT}}{V_{IN}I_{IN}}.$$

Define the input current $I_{IN}$ as the sum of the average current conducted by M1 $I_{M1}$ and the sum of the average current conducted by the gate driver in the PWM block 102 $I_{GD}$ to turn on M1 and M2.

$$I_{IN} = I_{GD} + I_{M1}$$

Define $Q_G$ as the charge delivered by the gate driver in the PWM block 102 to turn M1 and M2, also referred to as gate charge. M1 and M2 are turned on every switching period such that the product of gate charge $Q_G$ and the switching frequency $f_{SW}$ is the average current conducted by the gate driver. Therefore, the average current consumed by the gate driver in the PWM block 102 can be expressed as $$I_{GD} = Q_G f_{SW}.$$

By using the canonical definition of time average, the average current conducted by M1 can be expressed as $$I_{M1} = DI_{OUT}.$$

Therefore, the input current can be expressed as $$I_{IN} = Q_G f_{SW} + DI_{OUT}.$$

Dividing the expression by IOUT produces a useful expression that can be easily substituted into the expression that describes the efficiency of the switching converter circuit 100.

$$\frac{I_{IN}}{I_{OUT}} = \frac{Q_G f_{SW}}{I_{OUT}} + D$$

Substituting the equation above into the efficiency expression produces $$\eta = \frac{P_{OUT}}{P_{IN}} = \frac{V_{OUT} I_{OUT}}{V_{IN} I_{IN}} = \frac{V_{OUT}}{V_{IN}} \frac{1}{\frac{Q_G f_{SW}}{I_{OUT}} + D}$$

Rewriting $$\frac{V_{OUT}}{V_{IN}}$$

in terms of D, δ, k, $$\frac{V_{OUT}}{V_{IN}} = \frac{D}{\delta k},$$

$$\eta = \frac{D}{\delta k} \frac{1}{\frac{Q_G f_{SW}}{I_{OUT}} + D}$$

Consider the term $$\frac{Q_G f_{SW}}{I_{OUT}}.$$

If $$I_{OUT} \gg Q_G f_{SW},$$

$$\frac{Q_G f_{SW}}{I_{OUT}} \cong 0.$$

Therefore, $$\frac{Q_G f_{SW}}{I_{OUT}} \approx 0,$$

$$\eta = \frac{D}{\delta k} \frac{1}{\frac{Q_G f_{SW}}{I_{OUT}} + D} \approx \frac{1}{\delta k}$$

Thus, the one's density of the output bitstream can be used to approximate the efficiency η of the switching converter circuit by assuming $$I_{OUT} \gg Q_G f_{SW}.$$

Making the same assumption in the $$\frac{I_{IN}}{I_{OUT}}$$

expression produces $$\frac{Q_G f_{SW}}{I_{OUT}} \approx 0,$$

$$\frac{I_{IN}}{I_{OUT}} = \frac{Q_G f_{SW}}{I_{OUT}} + D \approx D$$

Therefore, the assumption that $$I_{OUT} \gg Q_G f_{SW}$$

is equivalent to the assumption that $$\frac{I_{IN}}{I_{OUT}} \approx D.$$

Figure 3:
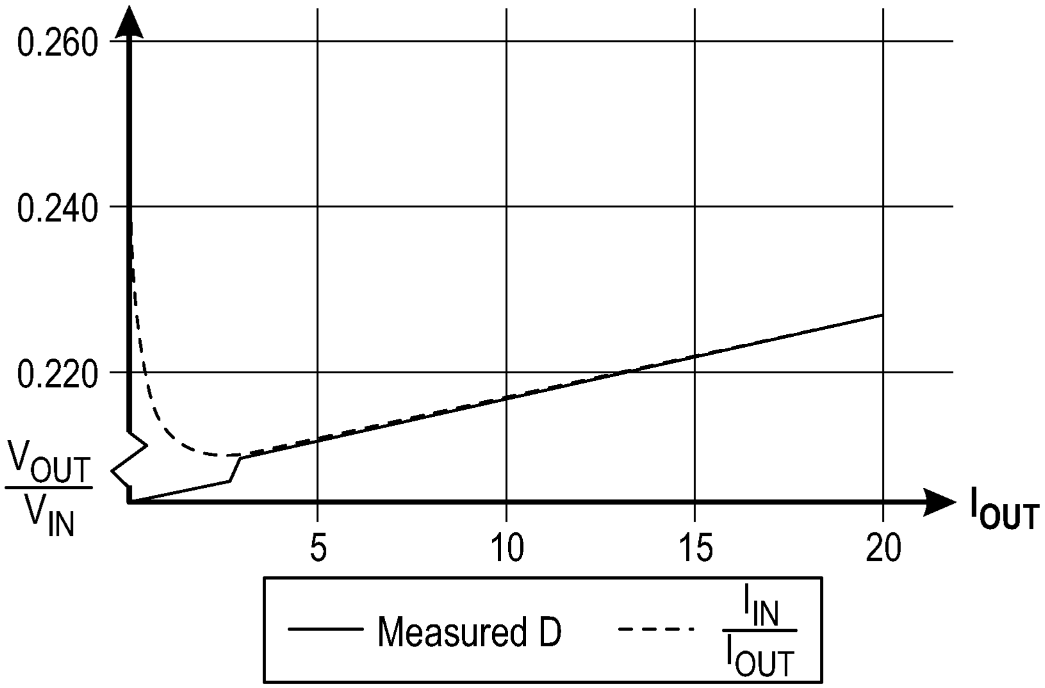
FIGS. 3-6 are graphs that illustrate operation of the efficiency monitor circuit.
Figure 4:
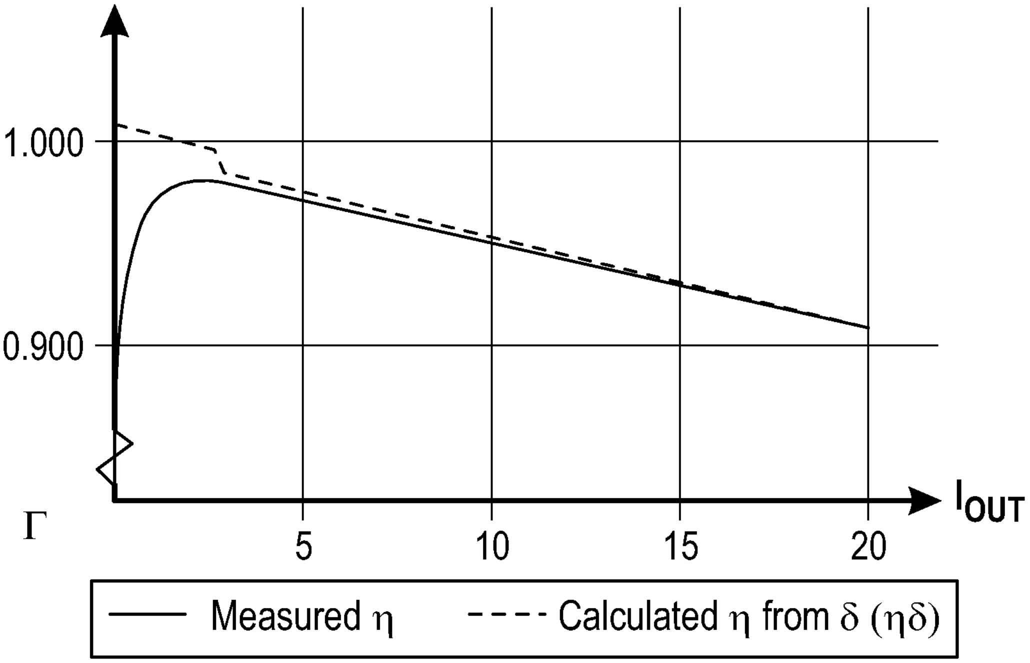

FIG. 3 is a graph of the measured duty cycle D overlaying a graph of $$\frac{I_{IN}}{I_{OUT}}$$

as a function of the output current $I_{OUT}$ or load current. The graph shows that D and $$\frac{I_{IN}}{I_{OUT}}$$

are approximately equal for medium to large load currents and diverge at light loads. FIG. 4 is a graph of the measured efficiency η of the switching converter circuit 100 and the efficiency η calculated from the bitstream δ. The graph shows that the measured efficiency η and the calculated efficiency η also diverge at light loads because the calculation uses the assumption the D and $$\frac{I_{IN}}{I_{OUT}}$$

are approximately equal.

The expression $$\frac{I_{IN}}{I_{OUT}} = \frac{Q_G f_{SW}}{I_{OUT}} + D$$

agrees with graphs depicted in FIG. 3 and FIG. 4. In switching converters, the quantity $Q_G f_{SW}$ is on the order of milliamperes. At medium to large load currents on the order of amperes, the term $$\frac{Q_G f_{SW}}{I_{OUT}}$$

is negligible such that $$\frac{Q_G f_{SW}}{I_{OUT}} \approx 0, \frac{I_{IN}}{I_{OUT}} = \frac{Q_G f_{SW}}{I_{OUT}} + D \approx D$$

Thus, at medium to large load currents, the one's density δ of the output bitstream can be used to approximate the efficiency η of the switching converter circuit 100 without the need for the real time computations including $V_{OUT}$, $I_{OUT}$, $V_{IN}$ and $I_{IN}$.

The assumption breaks down at light load currents because the term $$\frac{Q_G f_{SW}}{I_{OUT}}$$

increases with smaller currents such that it is no longer negligible. In other words, the assumption that $$\frac{I_{IN}}{I_{OUT}} \approx D$$

is valid at medium to large load currents because the duty cycle D only accounts for the conduction (on resistance) and transition (I-V overlap) losses of the switching converter circuit 100, which dominate at such conditions. The quantity $$\frac{I_{IN}}{I_{OUT}}$$

is representative of the total losses because it includes the switching (gate charge) losses encapsulated by the term $$\frac{Q_G f_{SW}}{I_{OUT}}$$

in addition to the conduction and transition losses. Therefore, the quantity $$\frac{I_{IN}}{I_{OUT}}$$

is always greater than the duty cycle D, which can be seen in FIG. 3.

At light load currents in which switching (gate charge) loss dominates, the approximation breaks down because the switching loss remains constant while the conduction and transition losses decrease with the output current. The approximation holds at medium to large load currents because the conduction and transition losses are much greater than the switching losses.

Figure 5:
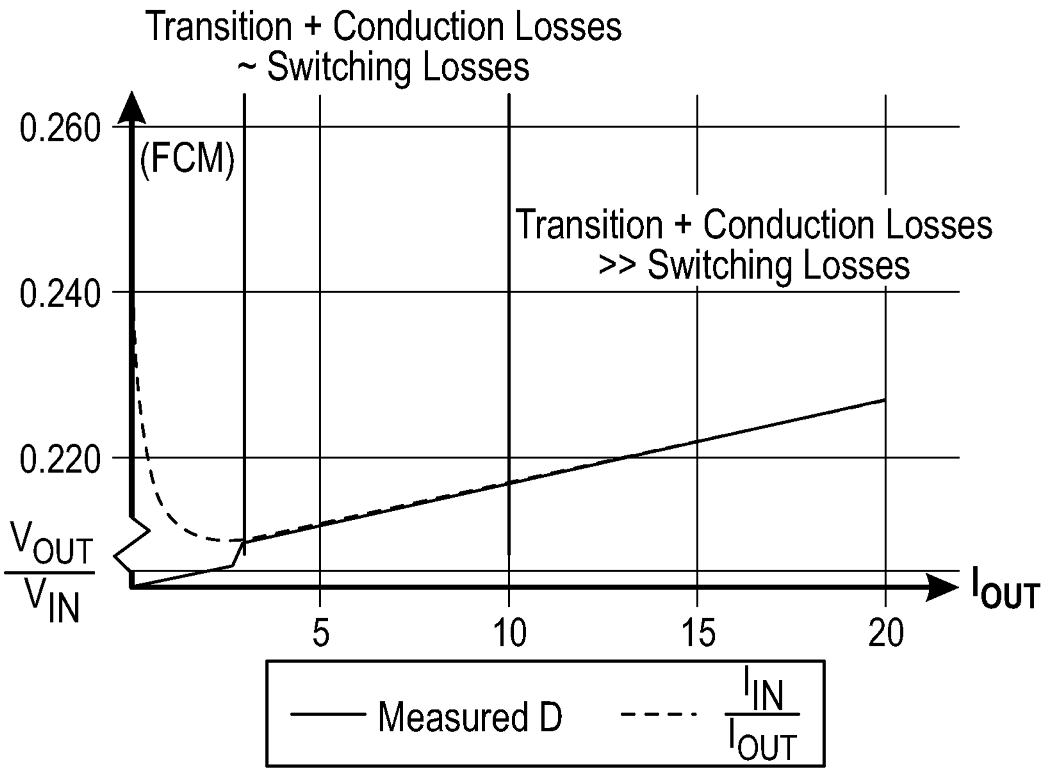
Figure 6:
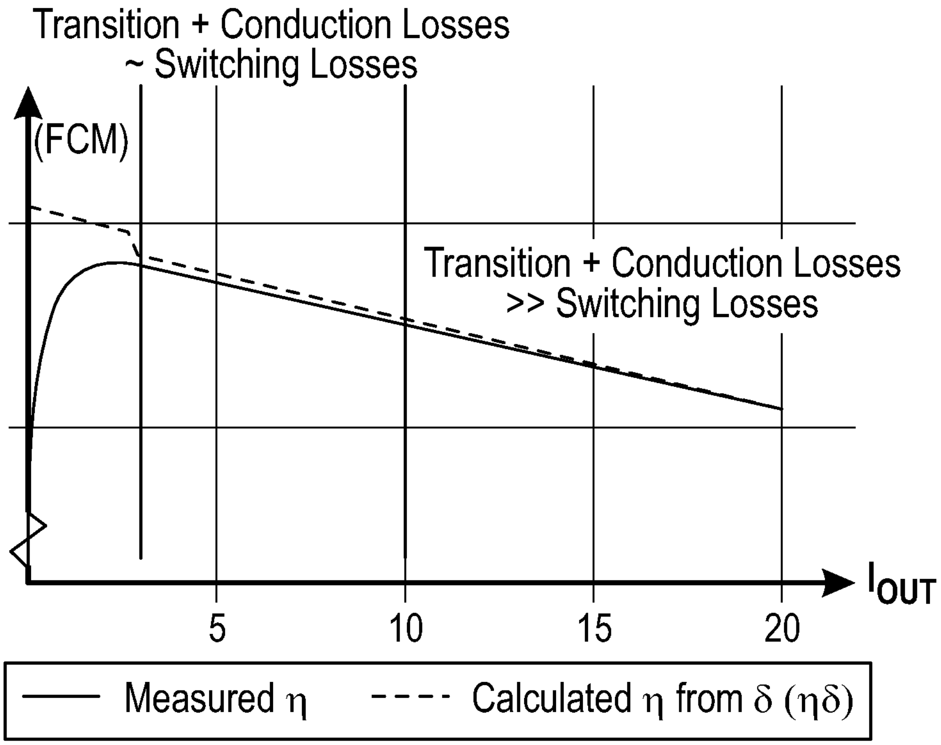

FIGS. 5 and 6 show the graphs of FIGS. 3 and 4 with the operating conditions indicated for large load currents where the transition and conduction losses are much greater than the switching losses (equivalently $I_{OUT} >> Q_G f_{SW}$), medium load currents where the transition and conduction losses are similar to the switching losses (equivalently $I_{OUT} \sim Q_G f_{SW}$), and light load currents where the transition and conduction losses are less than the switching losses (equivalently $I_{OUT} << Q_G f_{SW}$).

In forced continuous conduction mode (FCM), the output current $I_{OUT}$ is less than the change in inductor current resulting in negative inductor currents such that the PWM block 102 enables M1 and M2 to conduct negative current. Generally, FCM operation occurs for light load currents with large changes in inductor current. For FCM operation in such light load conditions, the efficiency η calculated from the bitstream based on the invalid assumption that $I_{OUT} >> Q_G f_{SW}$ (or equivalently $$\frac{I_{IN}}{I_{OUT}} \approx D)$$

goes above the theoretical maximum efficiency of 1 because in forced continuous conduction mode (FCM), the body diode of the high side power transistor $M_1$ conducts due to negative inductor current and alters voltage-second balance of the inductor L. The breakdown in the assumption that $I_{IN}/I_{OUT}$ is approximately equal to the duty cycle D at light load currents and the decrease of D due to FCM operation at very light loads result in inaccuracies of the efficiency η calculated from the bitstream of the sigma-delta ADC.

An expression that approximates efficiency at light load currents for FCM operation can be determined by revisiting the original efficiency expression and considering that $I_{OUT} << Q_G f_{SW}$ at such light load currents.

$$\frac{Q_G f_{SW}}{I_{OUT}} >> \text{D}, \eta = \frac{D}{\delta k} \frac{1}{\frac{Q_G f_{SW}}{I_{OUT}} + D} \approx \frac{1}{\delta k} \frac{D I_{OUT}}{Q_G f_{SW}}$$

Therefore, the output bitstream obtained from the efficiency monitor circuit 106 can be used to approximate real time efficiency of the switching converter at any load currents without real time computations that are not only difficult to practically achieve given area and power considerations, but also may not consider the conditions within the converter that implicitly influence efficiency, such as temperature.

$$\eta = \frac{D}{\delta k} \frac{1}{\frac{Q_G f_{SW}}{I_{OUT}} + D}$$

$$I_{OUT} >> Q_G f_{SW}, \frac{Q_G f_{SW}}{I_{OUT}} \approx 0, \eta = \frac{D}{\delta k} \frac{1}{\frac{Q_G f_{SW}}{I_{OUT}} + D} \approx \frac{1}{\delta k}$$

$$I_{OUT} << Q_G f_{SW}, \frac{Q_G f_{SW}}{I_{OUT}} >> \text{D}, \eta = \frac{D}{\delta k} \frac{1}{\frac{Q_G f_{SW}}{I_{OUT}} + D} \approx \frac{1}{\delta k} \frac{D I_{OUT}}{Q_G f_{SW}}$$

Furthermore, the relative value of efficiency η determined using the relative value of the output bitstream is also useful. The relative difference in the output bitstream can be used as an alternative mechanism to measure efficiency. Such a mechanism is useful in determining whether a change in some aspect of converter operation was successful in improving efficiency without calculating the absolute efficiency.

Define bitstream 1, $\delta_1$, as the output bitstream produced by the efficiency monitor circuity 106 before a change in some aspect of converter operation and bitstream 2, $\delta_2$, as the output bitstream produced by the efficiency monitor circuity 106 after a change in some aspect of converter operation. Similarly, define efficiency 1, $\eta_1$, as the efficiency of the converter before a change in some aspect of converter and efficiency 2, $\eta_2$, as the efficiency of the converter after a change in some aspect of converter operation.

$$\eta_1 = \frac{D}{\delta_1 k}\frac{1}{\frac{Q_G f_{SW}}{I_{OUT}} + D}, \eta_2 = \frac{D}{\delta_2 k}\frac{1}{\frac{Q_G f_{SW}}{I_{OUT}} + D}$$

Define the change in efficiency $\Delta\eta$ as $$\Delta\eta = \eta_2 - \eta_1 = \frac{D}{\delta_2 k}\frac{1}{\frac{Q_G f_{SW}}{I_{OUT}} + D} - \frac{D}{\delta_1 k}\frac{1}{\frac{Q_G f_{SW}}{I_{OUT}} + D}$$

$$\Delta\eta = \eta_2 - \eta_1 = \frac{1}{k}\frac{D}{\frac{Q_G f_{SW}}{I_{OUT}} + D}\left(\frac{1}{\delta_2} - \frac{1}{\delta_1}\right)$$

$$\Delta\eta = \eta_2 - \eta_1 = \frac{1}{k}\frac{D}{\frac{Q_G f_{SW}}{I_{OUT}} + D}\left(\frac{\delta_1 - \delta_2}{\delta_2\delta_1}\right)$$

Define the change in bitstream $\Delta\delta$ as $$\Delta\delta = \delta_2 - \delta_1$$

Substituting the expression for $\Delta\delta$ in the expression for $\Delta\eta$ produces $$\Delta\delta = \delta_2 - \delta_1, \Delta\eta = \eta_2 - \eta_1 = \frac{1}{k}\frac{D}{\frac{Q_G f_{SW}}{I_{OUT}} + D}\left(\frac{-\Delta\delta}{\delta_2\delta_1}\right).$$

Therefore, a positive change in the bitstream indicates that the efficiency has decreased while a negative change in the bitstream indicates that the efficiency has increased.

$$\Delta\delta > 0 \rightarrow \Delta\eta < 0$$

$$\Delta\delta < 0 \rightarrow \Delta\eta > 0.$$

The efficiency $\eta$ reflected by either the absolute bit density $\delta$ in the bitstream or a relative change in the bit density $\delta$, can be used to change operation of a switching power supply to improve efficiency.

Returning to FIG. 1, the switching power supply circuit includes a controller circuit 120. The controller circuit can include a microcontroller, a microprocessor, an application specific integrated circuit (ASIC), or a field programmable gate array (FPGA). The controller circuit 120 includes logic circuitry to perform the functions described. The controller circuit 120 receives the bitstream generated by the efficiency monitor circuit 106 as an input and may change operation of the switching converter circuit 100 based on the bitstream. In some examples, the logic circuitry of the controller circuit 120 includes a state machine that receives the bitstream as an input and outputs a change to one or more operating parameters of the switching converter circuit 100.

For instance, the controller circuit 120 may change operation of the power transistors $M_1$ and $M_2$ according to the efficiency of the switching converter circuit reflected by the bitstream. In some examples, the power transistors $M_1$ and $M_2$ are segmented transistors that include multiple segments. Each segment of the transistors can be activated separately using a separate control input. Activating different control inputs or combinations of control inputs can change the effective area of a power transistor, such as to change its internal resistance or the amount of current to conduct for example. The controller circuit 120 may change the number of active segments in the power transistors $M_1$ and $M_2$ based on the bitstream from the efficiency monitor circuit 120.

In certain examples, the power transistors are segmented power FETs that include multiple FET segments that can be activated in parallel. The separate FET segments may include separate gate inputs. The controller circuit 120 may change the number of active FET segments used in a power transistor by driving different gate inputs or combinations of the gate inputs. The controller circuit 120 may activate a different number of segments in power transistor $M_1$ and power transistor $M_2$ to configure different electrical characteristics in the power transistors.

In some examples, a boosted voltage level may be used to control one or both of the power transistors $M_1$ and $M_2$. The controller circuit 120 may change the level of the boosted voltage applied to the control input of the power transistors $M_1$ and $M_2$ based on the bitstream from the efficiency monitor circuit 106. In some examples, the controller circuit 120 may change the dead time imposed between the alternate activation of the power transistors $M_1$ and $M_2$. Changing one or both of the level of the boosted voltage and the dead time can change the operating efficiency of the switching converter circuit, and the change in efficiency will be reflected in the bitstream.

Figure 7:
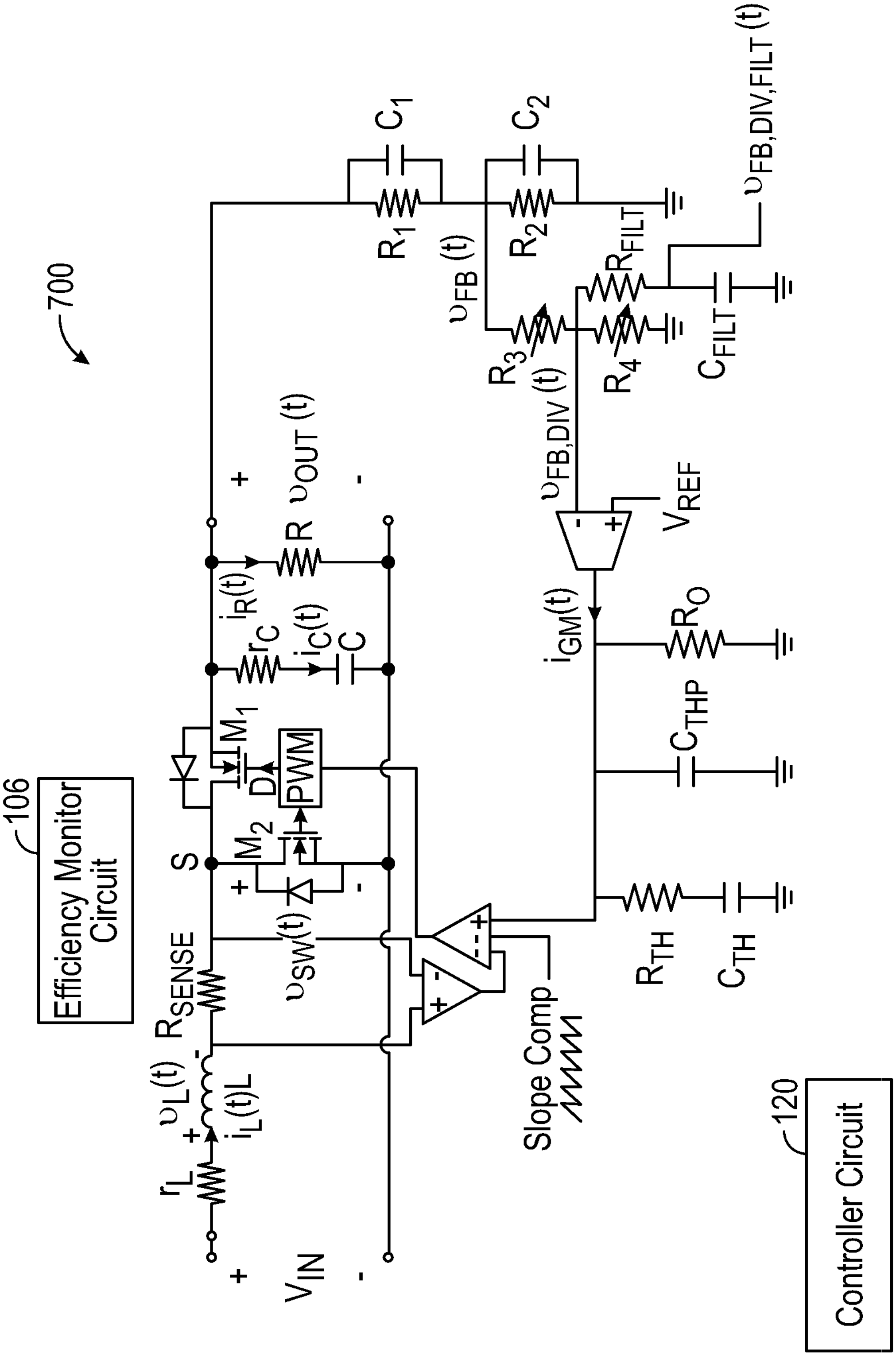
FIG. 7 is a circuit diagram of another example of a switching power supply circuit for an electronic system.

Although the function of the efficiency monitor circuit 106 of FIG. 2 has been described in relation to the switching buck converter circuit of FIG. 1, the efficiency monitor circuit can be used in other switching circuit topologies as well. FIG. 7 is a circuit diagram of a boost converter circuit 700 that produces an output voltage vout(t) at load R that is greater than the input voltage $V_{IN}$. The inputs to the efficiency monitor circuit 106 are VIN, VOUT, and the translated voltage level signal SW_DC(t) derived from voltage $v_{SW}(t)$ of the switch node S as shown in FIG. 7. The bitstream bit density $\delta$ can be used to estimate the efficiency $\eta$ of the boost converter circuit 700. For small output currents. the bitstream bit density $\delta$ is useful to monitor the relative change in efficiency in the boost converter circuit 700.

Figure 8:
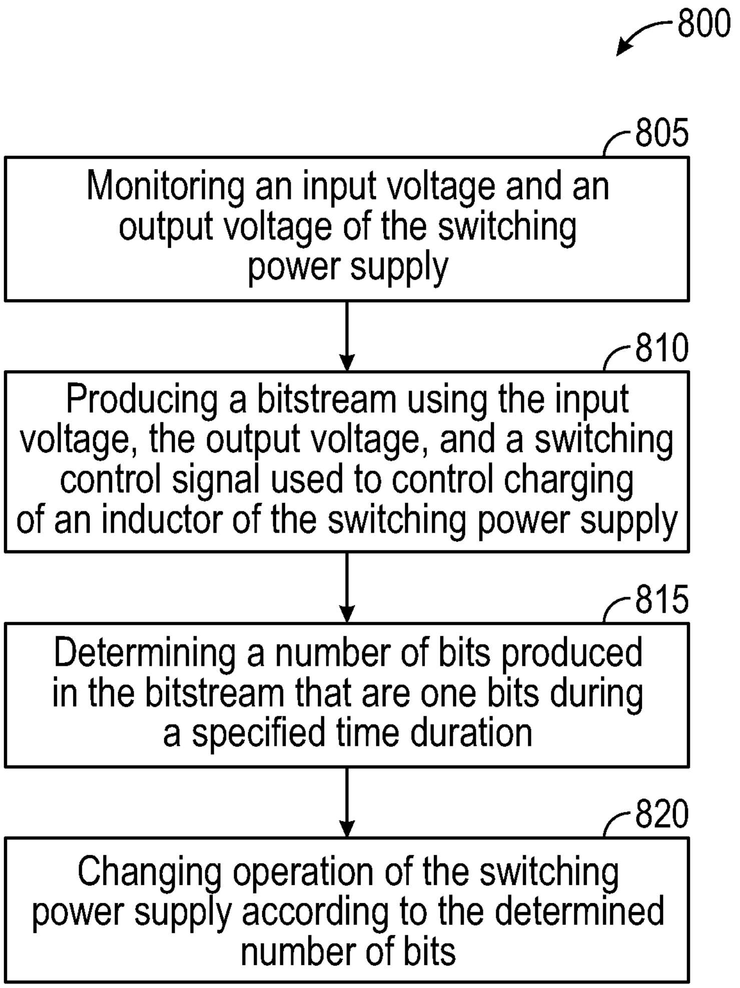
FIG. 8 is a flow diagram of an example of a method of operating a switching power supply circuit.

For completeness, FIG. 8 shows a flow diagram of an example of a method 800 of operating a switching power supply. The switching power supply may be a switching power supply shown in the examples of FIGS. 1 and 7. At block 805. an input voltage and an output voltage of the switching power supply are monitored. The voltages may be monitored using the efficiency monitor circuit 106 of FIG. 2. At block 810, a bitstream is produced using the input voltage, the output voltage, and a switching control signal used to control charging of an inductor of the switching power supply. The bitstream may be produced using a sigma-delta ADC as in FIG. 2.

At block 815, a number of bits produced in the bitstream that are one bits is determined during a specified time duration. The time duration may be specified as a predetermined number of clock cycles and a count of the number of bits in the bitstream that are one bits is accumulated over the number of clock cycles. This determined number of bits can be used to determine the density of one bits in the bitstream.

In variations, the number of zero bits is accumulated and the density of one bits in the bitstream is derived using the number of zero bits.

At block 820, the operation of the switching power supply is changed according to the generated bitstream. The bitstream provides either an approximation of the absolute efficiency of the current configuration of the switching power supply, or the changes in the bitstream provide an indication of changes (e.g., trending) of the efficiency of the current configuration of the switching power supply. The bitstream can be used as feedback to change the configuration of the switching power supply. The changes to the switching power supply can be triggered by detecting a threshold of the density of one bits in the bitstream that triggers the change, or the configuration of the switching power supply can be changed recurrently according to a schedule and the bit stream is used to throttle operation of the switching power supply.

The techniques described herein allow for real time monitoring of the efficiency of a switching power supply without burdensome computations needed in real time, or more complex monitoring support using a PMBus.

The following are example embodiments of systems and methods of operation, in accordance with the teachings herein.

Example 1 includes subject matter (such as a method of operating a switching power supply) comprising monitoring an input voltage and an output voltage of the switching power supply, producing a bitstream using the input voltage, the output voltage, and a switching control signal used to control charging of an inductor of the switching power supply, determining a number of bits produced in the bitstream that are one bits during a specified time duration, and changing operation of the switching power supply according to the determined number of bits.

In Example 2, the subject matter of Example 1 optionally includes producing the bitstream by applying the input voltage, the output voltage, and the switching control signal to a sigma-delta analog-to-digital converter (ADC) circuit.

In Example 3, the subject matter of Example 2 optionally includes controlling a source current provided at an input node of the sigma-delta ADC circuit using the produced bitstream and the output voltage; and controlling a sink current from the input node of the sigma-delta ADC circuit using the input voltage and the switching control signal.

In Example 4, the subject matter of one or any combination of Examples 1-3 optionally includes determining a ratio that includes the determined number of bits that are one bits and a total number of bits in the bitstream during the specified time duration; and wherein the changing the operation of the switching power supply includes changing the operation of the switching power supply according to the determined ratio.

In Example 5, the subject matter of one or any combination of Examples 1-4 optionally includes using the switching control signal to control activation of multiple segments of at least one segmented power transistor; and wherein changing operation of the switching power supply includes changing a number of active segments of the at least one segmented power transistor.

In Example 6, the subject matter of one or any combination of Examples 1-5 optionally includes generating the output voltage of the switching power supply by activating and deactivating first and second power transistors to charge and discharge the inductor; and wherein changing operation of the switching power supply includes changing a dead time between activation of the first power transistor and the second power transistor according to the according to the determined number of bits.

In Example 7, the subject matter of one or any combination of Examples 1-6 optionally includes generating the output voltage of the switching power supply by activating and deactivating first and second power transistors to charge and discharge the inductor; and wherein changing operation of the switching power supply includes changing a voltage applied to a control input of at least one of the first and second power transistors according to the according to the determined number of bits.

In Example 8, the subject matter of one or any combination of Examples 1-7 optionally includes determining that the output current of the switching converter circuit is less than a specified threshold output current value; detecting a change in the number of bits between a first specified time duration and a second specified time duration; and changing the operation of the switching converter circuit according to the determined change in the number of bits when the output current of the switching converter circuit is less than the specified threshold output current value.

Example 9 includes subject matter (such as a circuit to monitor efficiency of a switching converter circuit) or can optionally be combined with one or any combination of Examples 1-8 to include such subject matter, comprising a first input to receive an output voltage of the switching converter circuit; a second input to receive an input voltage of the switching converter circuit; a third input to receive a switching control signal used to control charging of an inductor of the switching converter circuit; and a sigma-delta analog-to-digital converter (ADC) circuit to output a serial bitstream representative of efficiency of the switching converter circuit using the input voltage, the output voltage, and the switching control signal.

In Example 10, the subject matter of Example 9 optionally includes a first switch circuit connected to an input node of the sigma-delta ADC circuit, wherein an input to the first switch circuit is connected to a current source sourcing a current controlled by the output voltage of the switching converter circuit and a control input of the first switch circuit is connected to the output of the sigma-delta ADC circuit; and a second switch circuit connected to the input node of the sigma-delta ADC circuit, wherein an input to the second switch circuit is connected to a current sink that sinks a current controlled by the input voltage of the switching converter circuit and a control input of the second switch circuit is controlled by the switching control signal.

In Example 11, the subject matter of one or both of Examples 9 and 10 optionally includes a sigma-delta ADC circuit that includes an integrator stage, a one-bit analog-to-digital converter (ADC) stage connected to the integrator stage, and a feedback circuit path including a first switch circuit connected to an output of the one-bit ADC stage and an input of the integrator stage. The first switch circuit is configured to apply a current controlled by the output voltage of the switching converter circuit to the input of the sigma-delta ADC circuit.

In Example 12, the subject matter of one or any combination of Examples 9-11 optionally includes logic circuitry connected to the output of the sigma-delta ADC and configured to determine a number of bits of the serial bitstream that are one bits in the bitstream during a specified time duration.

In Example 13, the subject matter of one or any combination of Examples 9-12 optionally includes logic circuitry configured to determine a ratio including the determined number of bits that are one bits in the bitstream during a specified time duration and a total number of bits in the bitstream during the specified time duration.

Example 14 includes subject matter (such as an electronic system) or can optionally be combined with one or any combination of Examples 1-13 to include such subject matter, comprising a switching converter circuit, an efficiency monitor circuit, and a controller circuit. The switching converter circuit includes an input to receive an input voltage and an output to provide an output voltage, at least one inductor, and a switch control circuit to produce a switching control signal used to control charging of an inductor of the switching converter circuit to produce the output voltage. The efficiency monitor circuit includes a first input connected to the output of the switching converter circuit, a second input connected to the input of the switching converter circuit, a third input connected to a switch control circuit of the switching converter circuit, and a sigma-delta analog-to-digital converter (ADC) circuit including an output to generate a bitstream representative of efficiency of the switching converter circuit using the input voltage the output voltage, and the switching control signal of the switching converter circuit. The controller circuit is configured to change operation of the switching converter circuit according to the generated bitstream.

In Example 15, the subject matter of Example 14 optionally includes a controller circuit including logic circuitry configured to determine a number of bits produced in the bitstream that are one bits during a specified time duration and change the operation of the switching converter circuit according to the determined number of bits.

In Example 16, the subject matter of Example 15 optionally includes a switching converter circuit including a switch circuit including at least one segmented power transistor to charge the inductor, and logic circuitry configured to change a number of active segments of the at least one segmented power transistor according to the determined number of bits.

In Example 17, the subject matter of one or both of Examples 15 and 16 optionally includes a switching converter circuit including a switch circuit including first and second power transistors that are activated and deactivated to charge and discharge the inductor, and logic circuitry configured to change a voltage applied to a control input of at least one of the first and second power transistors according to the according to the determined number of bits.

In Example 18, the subject matter of one or any combination of Examples 15-17 optionally includes a switching converter circuit includes a switch circuit including first and second power transistors that are activated and deactivated to charge and discharge the inductor, and logic circuitry configured to change a dead time between activation of the first power transistor and the second power transistor according to the according to the determined number of bits.

In Example 19, the subject matter of one or any combination of Examples 15-18 optionally includes logic circuitry configured to determine a ratio that includes the determined number of bits that are one bits and a total number of bits in the bitstream during the specified time duration, and change the operation of the switching converter according to the determined ratio.

In Example 20, the subject matter of one or any combination of Examples 15-19 optionally includes an output current monitoring circuit connected to the switching converter circuit and configured to detect when an output current of the switching converter circuit is less than a specified threshold output current value, and a controller circuit configured to detect a change in the number of bits between a first specified time duration and a second specified time duration when the output current monitoring circuit indicates the output current of the switching converter circuit is less than the specified threshold output current value, and change the operation of the switching converter circuit according to the determined change in the number of bits.

Each of the non-limiting aspects described herein can stand on its own or can be combined in various permutations or combinations with one or more of the other aspects or other subject matter described in this document. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following aspects, the terms "including" and "comprising" are open-ended, that is, a system, device, article, composition, formulation, or process that includes elements in addition to those listed after such a term in a claim are still deemed to fall within the scope of that claim. Moreover, in the following aspects, the terms "first," "second," and "third," etc., are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following aspects are hereby incorporated into the Detailed Description as examples or embodiments, with each aspect standing on its own as a separate embodiment, and it is contemplated that such embodiments can be combined with each other in various combinations or permutations.

What is claimed is:

1. A method of operating a switching power supply, the method comprising:

monitoring an input voltage and an output voltage of the switching power supply;

producing a bitstream using the input voltage, the output voltage, and a switching control signal used to control charging of an inductor of the switching power supply;

determining ratio that includes a number of bits produced in the bitstream that are one bits and a total number of bits during a specified time duration; and changing operation of the switching power supply according to the determined ratio.

2. The method of claim 1, wherein the producing the bitstream includes producing the bitstream by applying the input voltage, the output voltage, and the switching control signal to a sigma-delta analog-to-digital converter (ADC) circuit.

3. The method of claim 2, including:

controlling a source current provided at an input node of the sigma-delta ADC circuit using the produced bitstream and the output voltage; and controlling a sink current from the input node of the sigma-delta ADC circuit using the input voltage and the switching control signal.

4. The method of claim 1, including:

using the switching control signal to control activation of multiple segments of at least one segmented power transistor; and wherein changing operation of the switching power supply includes changing a number of active segments of the at least one segmented power transistor.

5. The method of claim 1, including:

generating the output voltage of the switching power supply by activating and deactivating first and second power transistors to charge and discharge the inductor; and wherein changing operation of the switching power supply includes changing a dead time between activation of the first power transistor and the second power transistor according to the according to the determined number of bits.

6. The method of claim 1, including:

generating the output voltage of the switching power supply by activating and deactivating first and second power transistors to charge and discharge the inductor; and wherein changing operation of the switching power supply includes changing a voltage applied to a control input of at least one of the first and second power transistors according to the according to the determined number of bits.

7. The method of claim 1, including:

determining that the output current of the switching converter circuit is less than a specified threshold output current value;

detecting a change in the number of bits between a first specified time duration and a second specified time duration; and changing the operation of the switching converter circuit according to the determined change in the number of bits when the output current of the switching converter circuit is less than the specified threshold output current value.

8. A circuit to monitor efficiency of a switching converter circuit, the circuit comprising:

a first input to receive an output voltage of the switching converter circuit;

a second input to receive an input voltage of the switching converter circuit;

a third input to receive a switching control signal used to control charging of an inductor of the switching converter circuit;

a sigma-delta analog-to-digital converter (ADC) circuit to output a serial bitstream representative of efficiency of the switching converter circuit using the input voltage, the output voltage, and the switching control signal; and logic circuitry configured to determine a ratio including a number of bits that are one bits in the serial bitstream during a specified time duration and a total number of bits in the serial bitstream during the specified time duration.

9. The circuit of claim 8, including:

a first switch circuit connected to an input node of the sigma-delta ADC circuit, wherein an input to the first switch circuit is connected to a current source sourcing a current controlled by the output voltage of the switching converter circuit and a control input of the first switch circuit is connected to the output of the sigma-delta ADC circuit; and a second switch circuit connected to the input node of the sigma-delta ADC circuit, wherein an input to the second switch circuit is connected to a current sink that sinks a current controlled by the input voltage of the switching converter circuit and a control input of the second switch circuit is controlled by the switching control signal.

10. The circuit of claim 8, wherein the sigma-delta ADC circuit includes:

an integrator stage;

a one-bit analog-to-digital converter (ADC) stage connected to the integrator stage; and a feedback circuit path including a first switch circuit connected to an output of the one-bit ADC stage and an input of the integrator stage, wherein the first switch circuit is configured to apply a current controlled by the output voltage of the switching converter circuit to the input of the sigma-delta ADC circuit.

11. An electronic system, the system comprising:
a switching converter circuit including:
an input to receive an input voltage and an output to provide an output voltage;
at least one inductor; and
a switch control circuit to produce a switching control signal used to control charging of an inductor of the switching converter circuit to produce the output voltage;
an efficiency monitor circuit including:
a first input connected to the output of the switching converter circuit;
a second input connected to the input of the switching converter circuit;
a third input connected to a switch control circuit of the switching converter circuit; and
a sigma-delta analog-to-digital converter (ADC) circuit including an output to generate a bitstream representative of efficiency of the switching converter circuit using the input voltage the output voltage, and the switching control signal of the switching converter circuit; and
a controller circuit including logic circuitry configured to: determine a number of bits produced in the bitstream that are one bits during a specified time duration; and
change the operation of the switching converter circuit according to the determined number of bits.

12. The system of claim 11,
wherein the switching converter circuit includes a switch circuit including at least one segmented power transistor to charge the inductor; and
wherein the logic circuitry is configured to change a number of active segments of the at least one segmented power transistor according to the determined number of bits.

13. The system of claim 11,
wherein the switching converter circuit includes a switch circuit including first and second power transistors that are activated and deactivated to charge and discharge the inductor; and
wherein the logic circuitry is configured to change a voltage applied to a control input of at least one of the first and second power transistors according to the according to the determined number of bits.

14. The system of claim 11,
wherein the switching converter circuit includes a switch circuit including first and second power transistors that are activated and deactivated to charge and discharge the inductor; and
wherein the logic circuitry is configured to change a dead time between activation of the first power transistor and the second power transistor according to the according to the determined number of bits.

15. The system of claim 11, wherein the controller circuit includes logic circuitry configured to:
determine a ratio that includes the determined number of bits that are one bits and a total number of bits in the bitstream during the specified time duration; and
change the operation of the switching converter according to the determined ratio.

16. The system of claim 11, including:
an output current monitoring circuit connected to the switching converter circuit and configured to detect when an output current of the switching converter circuit is less than a specified threshold output current value;
wherein the controller circuit is configured to:
detect a change in the number of bits between a first specified time duration and a second specified time duration when the output current monitoring circuit indicates the output current of the switching converter circuit is less than the specified threshold output current value; and
change the operation of the switching converter circuit according to the determined change in the number of bits.

* * * * *